Patented Dec. 15, 1931

1,836,307

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

PREPARATION OF ORTHO- AND PARA-HYDROXY DIPHENYL

Application filed November 13, 1928. Serial No. 319,170.

The present invention relates to methods for the preparation of ortho- and para-hydroxy diphenyls and for the separation of such compounds from each other.

In the process for the manufacture of phenol by the hydroylsis of chlorbenzene, the latter is heated with an aqueous caustic alkali solution under pressure at a temperature between 300° and 400° C. The reaction product is separated from whatever diphenyl oxide has been formed, and the aqueous alkaline solution is thereupon acidulated to liberate phenol. The crude phenol is then distilled under vacuum at a temperature of about 140° C. for the preparation of a pure product. A tarry residue remains in the still which has been found to consist chiefly of a mixture of ortho- and para-hydroxy diphenyls.

The hydroxy diphenyls may be regarded as phenyl-phenols derived from phenol by the substitution of a phenyl group in the benzene ring. Such compounds possess similar chemical properties to those of the phenols in general, and are capable of yielding valuable chemical products. A method for the recovery and separation of the aforesaid compounds is therefore much to be desired.

To the accomplishment of the foregoing and related ends, the invention, then, consists of the steps hereinafter fully described and particularly pointed out in the claims, the annexed drawings and the following description setting forth but a few of the ways in which the principle of the invention may be used.

In said annexed drawings:—

Figure 1:
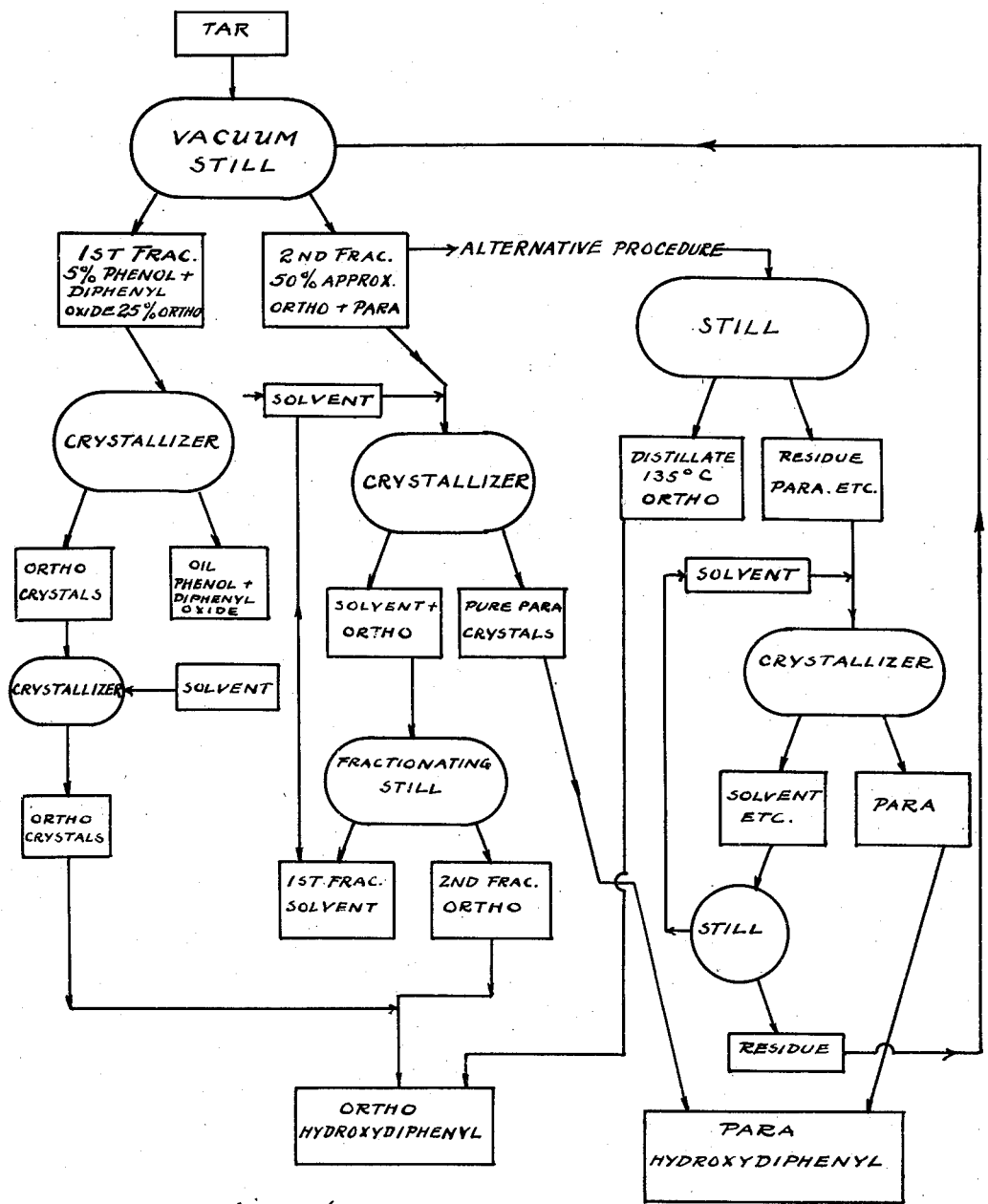
Figure 2:
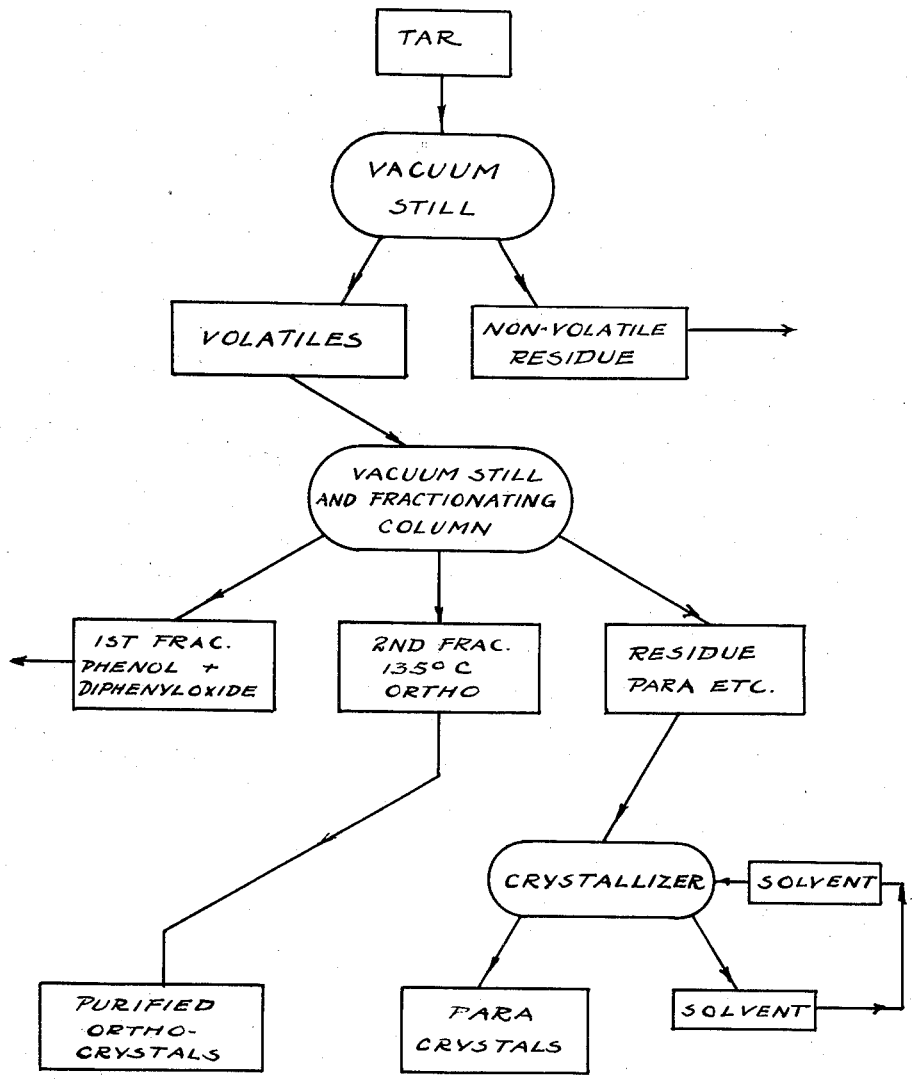

Fig. 1 is a diagrammatic representation on the order of a flow sheet showing the sequence of operations incident to one approved procedure for carrying out the invention, such procedure, however, involving certain alternative intermediate steps. Fig. 2, likewise in the form of a flow sheet, illustrates a simplified mode of procedure.

The boiling point of ortho-hydroxy diphenyl at atmospheric pressure is approximately 285° C., while that of the para-compound is 315° C. It has been found that a good separation of the two compounds is not easily obtained by distillation with ordinary fractionating equipment, as the boiling points at the elevated temperatures in question are too close together. However, I have found that when the distillation is carried out under reduced pressure the respective boiling points diverge more widely, the interval between them then becoming sufficient to permit of a substantially complete separation by means of fractional distillation with the usual equipment. For example, at a pressure of 9 mm. of mercury, the boiling point of ortho-hydroxy diphenyl becomes 135° C., while that of the para-derivative is 180° C. In consequence thereof a practicable method for the separation of the foregoing two compounds is afforded. By distilling at reduced pressure also any tendency toward decomposition of the compounds is minimized or altogether avoided.

Furthermore I have found that the para-compound may be separated from the ortho-isomer by crystallization from a suitable solvent. It was to be expected, by analogy with other isomeric di-substituted benzene derivatives, such as the nitro-chlorbenzenes, nitro-toluenes and the dichlorbenzenes, that the para-isomer could be crystallized practically pure from the ortho-compound, the latter acting as solvent for the former. However, I have observed, that a mixture of ortho- and para-hydroxy diphenyls upon crystallization always yields crystals containing both the ortho- and para-compounds, respectively, in about the same proportion as in the original mixture. In other words, the para-compound cannot be crystallized in pure form from the ortho-compound as solvent, as in the case of other isomeric di-substituted benzene derivatives. On the other hand, I have found that para-hydroxy diphenyl crystallizes more rapidly from solvents such as benzene, chlorbenzene, dichlorbenzene, alcohol, kerosene, and the like, than does the ortho-compound, thus furnishing an alternative or supplementary means of purifying and separating the two compounds.

In carrying out my invention, as shown in

Fig. 1, the tar obtained from the phenol purification stills, as previously described, is distilled under reduced pressure, e. g., at a pressure of about 12 mm. of mercury, at a temperature above 140° C. For instance, the distillate may be collected in two fractions, one consisting of about 5 per cent. phenol and diphenyl oxide and 25 per cent. ortho-hydroxy diphenyl, and the other of 50 per cent. or somewhat less of a mixture of ortho- and para-hydroxy diphenyls, said percentages being expressed on the basis of the amount of tar used. From such first fraction the ortho-compound may be crystallized and separated from the oily layer containing phenol and diphenyl oxide, the crystals being purified by recrystallization from a suitable solvent, such as gasoline, kerosene or the like. The remaining fraction may then be recrystallized from a solvent, such as chlorbenzene, whereby the para-compound is obtained as pure crystals, or it may be fractionally distilled in a vacuum, whereby the ortho-compound distills over in practically pure form. According to the first procedure the mixture is dissolved in chlorbenzene by heating, and upon cooling pure crystals of the para-compound are precipitated. The crystals are filtered off and the filtrate is fractionally distilled, whereby the chlorbenzene comes over first and is recovered for reuse, and then at reduced pressure the ortho-hydroxy diphenyl distills over substantially pure. By the second procedure the mixture is fractionally distilled at a pressure of about 9 mm. of mercury and an exit temperature of the fractionating column of about 135° C., whereby the ortho-compound distills over substantially pure, while the para-compound remains in the still residue. The latter is then dissolved in a suitable solvent non-reactable therewith, such as benzene, chlorbenzene, or the like, from which the para-compound crystallizes in highly pure condition. The crystals are filtered off and the filtrate distilled for the recovery of the solvent, the still residue therefrom being added to a further quantity of crude material to be purified.

Instead of first obtaining a partial recovery and separation of one of the desired products followed by a working up of the remainder of the crude distillate according to one or the other of the procedures just described, I may fractionally distill the crude phenol tar directly, as shown in Fig. 2, thus securing a separation of the ortho- and para-hydroxy diphenyls in one step. Prior to such separation, the crude tar will be preferably subjected to simple distillation under reduced pressure in order to separate the volatile from the relatively non-volatile constituents thereof. The entire crude distillate will then be fractionally distilled directly at a pressure of about 9 mm. of mercury. A small amount of phenol and diphenyl oxide will pass over first. Then at a temperature of about 135° C. the ortho-compound will distill over in a substantially pure condition, while the para-compound will remain in the still residue. Such residue will then be dissolved in a suitable solvent, such as benzene, chlorbenzene, or the like, from which the para-compound will be crystallized in a high state of purity.

The ortho-compound, as obtained by any of the procedures just described, whether by crystallization or fractional distillation, still contains a small amount of impurity, from which it can not be separated by physical means. While such impurity is not of great moment as regards the usual technical utilization of the ortho-compound, it may at times be desirable to repurify the material so as to remove the last traces of impurity. To this end the ortho-compound is dissolved in an aqueous caustic alkali, in which the impurity does not dissolve. The latter is separated by filtering or extracting with an immiscible solvent. The alkaline solution is then acidulated, whereupon pure ortho-hydroxy diphenyl is precipitated, and is then filtered from the aqueous solution.

I do not limit myself to the particular conditions of reduced pressure and of temperature stated in the foregoing examples, as equally good results may be obtained by operating at somewhat different pressures and corresponding temperatures. That is, a range of pressure may be employed, varying from the highest vacuum to about 50 mm. of mercury, or more, with a corresponding variation in the boiling point of the compound or compounds to be distilled. The invention, therefore, includes the recovery and separation of ortho- and para-hydroxy diphenyls from mixtures containing such compounds by distillation at any practically convenient pressure less than atmospheric pressure.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of separating ortho- and para-hydroxy diphenyls from mixtures containing them which comprises fractionally distilling said mixture under reduced pressure, whereby said ortho-compound is obtained in the distillate, dissolving the residual still contents in a solvent nonreactible therewith and crystallizing said para-compound therefrom.

2. The method of separating ortho- and para-hydroxy diphenyls from mixtures containing them which comprises fractionally distilling said mixture under reduced pressure, whereby said ortho-compound is obtained in the distillate, dissolving the residual still contents in chlorbenzene and crystallizing said para-compound therefrom.

3. The method of separating ortho- and para-hydroxy-diphenyls from the crude phenol tar remaining after the distillation of the phenol product obtained by reacting mono-chlorobenzene with an aqueous caustic alkali solution, which comprises distilling such tar under reduced pressure to separate said hydroxy-diphenyls therefrom, fractionally distilling the latter under reduced pressure, whereby said ortho-compound is obtained in the distillate, dissolving the residual still contents in a solvent substantially non-reactable therewith, and crystallizing said para-compound therefrom.

4. The method of separating ortho- and para-hydroxy-diphenyls from the crude phenol tar remaining after the distillation of the phenol product obtained by reacting mono-chlorobenzene with an aqueous caustic alkali solution, which comprises distilling such tar under reduced pressure to separate said hydroxy-diphenyls therefrom, fractionally distilling the latter under reduced pressure, whereby said ortho-compound is obtained in the distillate, dissolving the residual still contents in mono-chlorobenzene, and crystallizing said para-compound therefrom.

5. The method of separating ortho- and para-hydroxy-diphenyls which comprises fractionally crystallizing the same from a solvent from the group consisting of benzene, chlorobenzene, dichlorobenzene, alcohol and kerosene.

6. The method of separating ortho- and para-hydroxy-diphenyls which comprises fractionally crystallizing the same from mono-chlorobenzene.

7. The method of separating ortho- and para-hydroxydiphenyls from the crude phenol tar remaining after the distillation of the phenol product obtained by reacting mono-chlorobenzene with an aqeous caustic alkali solution, which comprises distilling such tar under reduced pressure to separate said hydroxydiphenyls therefrom, fractionally distilling the latter at an absolute pressure of approximately 9 millimeters of mercury, collecting the distillate passing over at about 135° C. consisting of substantially pure ortho-hydroxydiphenyl, dissolving the still contents residue in mono-chlorobenzene and crystallizing para-hydroxydiphenyl therefrom.

Signed by me this 3rd day of November, 1928.

EDGAR C. BRITTON.

CERTIFICATE OF CORRECTION.

Patent No. 1,836,307.            Granted December 15, 1931, to

EDGAR C. BRITTON.

It is hereby certified that error appears in the printed specification of the above numbered patent requiring correction as follows: Page 1, line 93, for "rapidly" read readily; and that the said Letters Patent should be read with this correction therein that the same may conform to the record of the case in the Patent Office.

Signed and sealed this 16th day of February, A. D. 1932.

(Seal)                                          M. J. Moore,
Acting Commissioner of Patents.